US007991185B2

(12) United States Patent
Shi et al.

(10) Patent No.: US 7,991,185 B2
(45) Date of Patent: Aug. 2, 2011

(54) METHOD AND APPARATUS FOR IMAGE SPLICING/TAMPERING DETECTION USING MOMENTS OF WAVELET CHARACTERISTIC FUNCTIONS AND STATISTICS OF 2-D PHASE CONGRUENCY ARRAYS

(75) Inventors: Yun-Quing Shi, Millburn, NJ (US); Wen Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1052 days.

(21) Appl. No.: 11/772,671

(22) Filed: Jul. 2, 2007

(65) Prior Publication Data

US 2008/0037823 A1 Feb. 14, 2008

Related U.S. Application Data

(60) Provisional application No. 60/806,277, filed on Jun. 30, 2006.

(51) Int. Cl.
*G06K 9/00* (2006.01)
(52) U.S. Cl. .................................................. 382/100
(58) Field of Classification Search .................. 382/100, 382/284, 309; 726/32; 355/79
See application file for complete search history.

(56) References Cited

U.S. PATENT DOCUMENTS

| | | | | |
|---|---|---|---|---|
| 7,280,669 | B2 * | 10/2007 | Choi et al. ..................... | 382/100 |
| 7,386,146 | B2 * | 6/2008 | Le Floch ....................... | 382/100 |
| 2003/0053657 | A1 * | 3/2003 | Le Floch ....................... | 382/100 |
| 2005/0086223 | A1 * | 4/2005 | Rui .................................. | 707/5 |
| 2005/0195896 | A1 * | 9/2005 | Huang et al. ............. | 375/240.03 |
| 2007/0065034 | A1 * | 3/2007 | Monro .......................... | 382/240 |
| 2010/0104133 | A1 * | 4/2010 | Wong et al. .................... | 382/100 |

OTHER PUBLICATIONS

"Image Authentication Using Content Based Watermark", Circuits and Systems, IEEE, May 23-26, 2005, pp. 4014-4017 vol. 4.*
"Detecting Digital Forgeries Using Bispectral Analysis" by Hany Farid, Perceptual Science Group, MIT, Cambridge, MA 02139, pp. 1-9, 1999.
"Blind Detection of Photomontage Using Highter Order Statistics" by Tian-Tsong Ng et al., Department of Electrical Engineering, Columbia University, New York, NY, 2004.
"LOCO-I: A Low Complexity, Context-Bassed, Lossless Image Compression Algorithm" by Marcelo J. Weinberg et al., Hewlett-Packard Laboratories, Palo Alto, CA 94304, pp. 1-11, 1996.
"Invariant Measures of Image Features from Phase Information" by Peter Kovesi. "Videre: Journal of Computer Vision Research" by Peter Kovesi, Quarterly Journal, Summer 1999, vol. 1, No. 3, Teh MIT Press.
"A Tutorial on Support Vector Machines for Pattern Recognition" by Christopher J.C. Burges, Data Mining and Knowledge Discovery, 2, 121-167 (1998).

* cited by examiner

*Primary Examiner* — Matthew C Bella
*Assistant Examiner* — Shervin Nakhjavan
(74) *Attorney, Agent, or Firm* — Connolly Bove Lodge & Hutz LLP

(57) ABSTRACT

Embodiments of the invention are a novel splicing detection scheme that detects the spliced images by distinguishing image features that are extracted by exploiting both magnitude and phase information of a given image. The image features include the statistical moments of characteristic functions of wavelet subbands of a test image and a prediction-error image. In addition, the approximation (LL) subband at different levels is individually erased by forcing the wavelet coefficients to zero and the inverse wavelet transform is applied in order to produce reconstructed image with enhanced high frequency components. Further, the moments of the characteristic functions of these reconstructed images provide additional image features. Moreover, the statistics (mean, variance, skewness and kurtosis) of 2-D phase congruency array associated with the reconstructed images provide additional image features for splicing detection. These inputs provide a 120 dimensional image feature vector that includes 96 moment features and 24 phase features.

27 Claims, 10 Drawing Sheets

Statistics of 2D phase congruency

- Mean: $\mu = E\{PC_2(x,y)\}$

- Variance: $\sigma^2 = E\{(PC_2(x,y) - \mu)^2\}$

- Skewness: $\varsigma = E\left\{\left(\frac{PC_2(x,y) - \mu}{\sigma}\right)^3\right\}$

- Kurtosis: $\kappa = E\left\{\left(\frac{PC_2(x,y) - \mu}{\sigma}\right)^4\right\}$

FIG. 1D

METHOD AND APPARATUS FOR IMAGE SPLICING/TAMPERING DETECTION USING MOMENTS OF WAVELET CHARACTERISTIC FUNCTIONS AND STATISTICS OF 2-D PHASE CONGRUENCY ARRAYS

This application claims priority to U.S. Provisional Patent Application Ser. No. 60/806,277, filed Jun. 30, 2006.

FIELD OF THE INVENTION

Embodiments of the invention are directed toward an apparatus and methods for image splicing/tampering detection. In particular, various embodiments of the invention relate to apparatus and methods for the use of high-order statistical moments of wavelet characteristic functions and phase congruency in blind image splicing/tampering detection.

DESCRIPTION OF BACKGROUND ART

A photomontage is a pictorial composite made by joining several pictorial elements together. The manipulation of pictures or photographs has a long history that dates back to the invention of photography in the mid 19th century and was fully developed as an art form after World War I. Replacing one or more parts of a host picture with fragment(s) from the same host image or other pictures of such a photomontage may be considered as image tampering. In particular, image tampering is referred to as a malicious manipulation of an image for some purpose. One example is to forge a scene that actually never happened in order to purposely mislead observers of the image.

The development of digital imaging technology have made image tampering easier than ever before. Thus, especially for forensic purposes, there is an increasingly urgent need to detect whether or not an image tampering has occurred.

Image splicing is a simple and commonly used image tampering scheme for the malicious manipulation of images to forge a scene that actually never existed in order to mislead an observer. In particular, image splicing is the process of combining image fragments from the same or different images without further post-processing such as smoothing of boundaries among different fragments. Even without the post-processing, the artifacts introduced by the image splicing may be almost imperceptible. That is, in image splicing situations, it is often hard, if not impossible, for human observers to perceive that any image tampering has occurred. Thus, use of automated or blind detection schemes would be desirable for the task of splicing detection in order to automatically discriminate spliced images from non-spliced (authentic) images.

However, the blind detection of image splicing is a challenging task. Researchers have made several efforts to develop such splicing detection schemes. One example of the background art in this area is a report by H. Farid entitled: "Detection of Digital Forgeries using bispectral analysis," in Technical Report, AIM-1657, MIT AI Memo, 1999. In Farid, speech signal splicing was considered as a highly non-linear process and higher order spectral analysis, specifically bicoherence, was introduced in the detection task in order to deal with the problem.

A further extension of the above background art example to the image splicing/tampering detection problem is a method of blind splicing detection in a report by T.-T. Ng, S.-F. Chang, and Q. Sun entitled: "Blind detection of photomontage using higher order statistics," IEEE International Symposium on Circuits and Systems 2004, Vancouver, BC, Canada, May, 2004. However, the reported detection results of Ng et al. of a 72% success rate for image splicing/tampering detection over the Columbia Image Splicing Detection Evaluation Dataset is not high enough for reliable automated detection applications.

From the discussion above, it is clear that image splicing detection is of fundamental importance in the art. The blind image splicing detection methods of the background art have only achieved a probability of successful detection rate of 72% on the standard Columbia Image Splicing Detection Evaluation Dataset. Thus, there is a need in the art for further improvement in image splicing/tampering detection performance with blind methods for authenticating and detecting tampering in images.

SUMMARY OF THE INVENTION

Embodiments of the invention are directed at overcoming the foregoing and other difficulties encountered by the background arts. In particular, embodiments of the invention provide methods for blind splicing/tampering detection based on a blind image tampering detection scheme that utilizes high-order statistical moments of wavelet characteristic functions and 2-Dimensional (2-D) phase congruency.

Embodiments of the invention provide a novel splicing detection scheme. In particular, to detect the spliced images, distinguishing image features are extracted by exploiting both magnitude and phase information of a given test image. The first part of the image features are the statistical moments of characteristic functions of the test image, its prediction-error image, and their wavelet subbands. This image model is particularly adept at detecting changes caused by image splicing.

In addition, the approximation (LL) subbands at different levels are individually erased (i.e., the wavelet coefficients are forced to zero), and inverse wavelet transform are applied in order to enhance the high frequency components. From these reconstructed images with LL subbands erased, the moments of wavelet characteristic functions form a second part of features. Finally, the statistics (i.e., mean, variance, skewness and kurtosis) of 2-D phase congruency array associated with the above-mentioned reconstructed images provide a third part of features for splicing detection. As a result, there are total of 120 Dimensional (120-D) image features which include 96 moment features and 24 statistical phase features.

One embodiment of the invention is a method, processor-readable medium and apparatus for tampering detection, comprising: generating a prediction-error image from a test image; computing a reconstructed image of both the test image and the prediction-error image; computing a characteristic functions of both the test image and prediction-error image and the reconstructed image of both the test image and the prediction-error image; computing a 2-D phase congruency arrays from the reconstructed image of both the test image and the prediction-error image; computing $1^{st}$, $2^{nd}$, $3^{rd}$ order moments from the characteristic functions; computing a $1^{st}$, $2^{nd}$, $3^{rd}$ and $4^{th}$ order statistics from the 2-D phase congruency arrays; combining the moments and statistics to form a 120-D image feature vector; and analyzing the 120-D image feature vector with a Support Vector Machine (SVM) classifier configured to determine whether there is tampering in the test image; and the means for doing so.

In addition, embodiments of the invention include, but are not limited to a method, a processor-readable medium and means for tampering detection, comprising: selecting a test image; generating a prediction-error image from the test image; computing an reconstructed image of both the test image and the prediction-error image; computing a discrete wavelet transform (DWT) of both the test image and the prediction-error image; computing a histogram of the test image and the prediction-error test image; computing a histogram of the wavelet subband of both the test image and the prediction-error image; computing a histogram of the reconstructed image of both the test image and the prediction-error image; computing a discrete Fourier transform (DFT) of the histogram of both the test image and the prediction-error image; computing a DFT of the histogram of the wavelet subband of both the test image and the prediction-error image; computing a DFT of the histogram of the reconstructed image of both the test image and the prediction-error image; computing a 2-D phase congruency array of the reconstructed image of both the test image and the prediction-error image; computing moments of the DFT of the histogram of both the test image and the prediction-error image; computing moments of the DFT of the histogram of the wavelet subband of both the test image and the prediction-error image; computing moments of the DFT of the histogram of the reconstructed image of both the test image and the prediction-error image; computing statistics of the 2-D phase congruency array of the reconstructed image of both the test image and the prediction-error image; outputting a 78-Dimensional (78-D) moment feature vector of the DFT of the histogram of the wavelet subband of both the test image and the prediction-error image; outputting an 18-Dimensional (18-D) moment feature vector of the DFT of the histogram of the reconstructed image of both the test image and the prediction-error image; and outputting a 24-Dimensional (24-D) statistics feature vector of the 2-D phase congruency array of the reconstructed image of both the test image and the prediction-error image; and means for doing so.

Further, embodiments of the invention include a Support Vector Machine (SVM) classifier for the detection system. Both linear SVM and non-linear SVM with radial basis function (RBF) classifiers have been used in embodiments of the invention. The experimental results have demonstrated that the method of embodiments of the invention outperforms background art methods by providing about a 10% higher detection rate. The dependence of classification performance on the training sample size has been found not to be sensitive to the training size.

Further, embodiments of the invention use the concept of phase congruency (i.e., the phase congruency occurs when the Fourier phase has identical arrival in all Fourier harmonics) to improve the probability-of-detection of image splicing/tampering. In particular, embodiments of the invention exploit the fact that the Fourier phase conveys important information about the structure of the test image and provide additional features of the test image (e.g., step edges and lines) that can be used to improve tampering detection.

Furthermore, embodiments of the invention utilize phase congruency to provide an absolute measure of the significance of additional test image features in image splicing/tampering detection. In particular, embodiments of the invention utilize sharp image features (e.g., edges, lines, corners, etc), which give rise to high phase congruency, to extract additional features from a test image that may be used to further improve the probability-of-detection image splicing/tampering.

Extracting the above-discussed image features from a given test image and utilizing machine learning provide excellent splicing detection capability. In embodiments of the invention, splicing detection is a part of a two-class method for pattern recognition. That is, a given image is classified as either a spliced image or a non-spliced (authentic) image.

Experimental results that are further discussed below have shown that the embodiments of the invention can greatly outperform background art techniques when applied to the same image database (i.e., the Columbia Image Splicing Detection Evaluation Dataset) with a probability of successful detection rate of 82%.

Another embodiment of the invention is an apparatus comprising: means for applying a trained classifier to an image; and means for classifying said image based at least in part on applying a trained classifier to a host of features generated from said image. Preferably, the means for classifying comprises means for classifying based at least in part on applying a trained classifier comprising at least one of a trained Support Vector Machine (SVM) classifier, a trained neural network classifier and a trained Bayes classifier. Preferably, the means for classifying includes means for classifying based at least in part on a host of features generated from a prediction error of said image.

BRIEF DESCRIPTION OF THE DRAWINGS

FIG. 1D shows the equations for the computation of the mean, variance, kurtosis and skewness.

DETAILED DESCRIPTION OF THE INVENTION

Figure 1A:
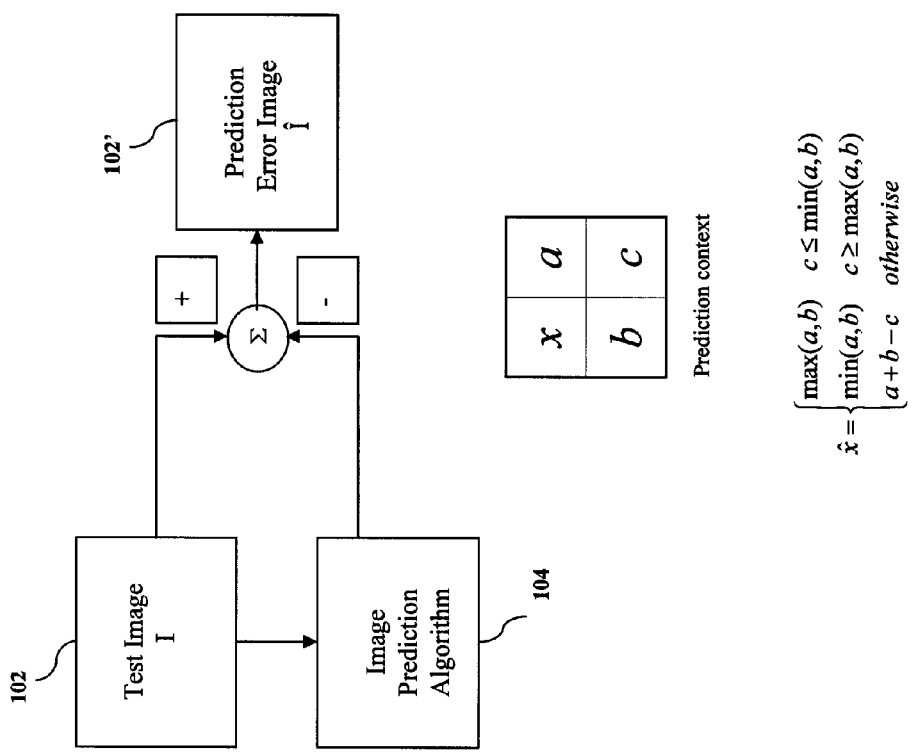
FIG. 1A is an exemplary block diagram for a method for generating prediction error image, where $\hat{x}$ denotes predicted x of a pixel in test image.

The distinguishing characteristics of the image model selected by embodiments of the invention are based on considering image tampering/splicing detection as a two-class pattern recognition problem. That is, the input images are categorized as one of: (1) spliced images (i.e., tampered); and (2) non-spliced images (authentic). Obviously, an authentic image is defined as the output of an image acquisition device that has no indication of splicing.

To accurately separate images that have been tampered with from authentic images, and thus, increase the probability-of-detection, a set of image features that clearly distinguishes between the two classes is desired. The following paragraphs describe how embodiments of the invention extract such image features based on: (1) statistical moments of wavelet characteristic functions; and (2) two-dimensional (2D) phase congruency.

A discussion of embodiments of the invention for determining moments of characteristic function of the image is provided by the following. The histogram of a digital image or its wavelet subbands is essentially the probability mass function (PMF), if the image grayscale values or the wavelet coefficient values are treated as random variables x. That is, the PMF is the normalized version of the histogram. In particular, the PMF $p_x$ may be expressed as a probability density function (PDF) $f_x$ by using the relation $$f_x(x_0) = \sum_a p_x(a)\delta(x_0 - a) \quad (1)$$

where in Equation (1) above, $\delta( )$ is the unit impulse function.

Using the relationship of Equation (1), embodiments of the invention compute the PDF, when each component of the histograms is multiplied by a corresponding shifted unit impulse function. Moreover, in accordance with probability and random process theory, the characteristic function (CF) can be seen as forming a Fourier transform pair (i.e., where the sign in the exponential reversed) with the PDF (histogram). Hence, embodiments of the invention utilize the Fourier transform of the histogram of an image or its wavelet subbands to obtain the characteristic function of the image or its wavelet subbands.

By denoting the histogram of an image or a wavelet subband of the image and the corresponding CF of an image by $h(f_j)$ and $H(f_k)$, respectively, embodiments of the invention use the statistical moments of the CFs of both a test image and the wavelet subbands as image features. In particular, the nth moment of the CF is defined in Equation (2) as:

$$M_n = \sum_{j=1}^{N/2} f_j^n |H(f_j)| \Big/ \sum_{j=1}^{N/2} |H(f_j)| \quad (2)$$

where $H(f_j)$ is the CF component at frequency $f_j$, N is the total number of points in the horizontal axis of the histogram. The value of N depends on the wavelet subband level. For images/prediction-error images, N=256 for an 8-bit grayscale image, for subband levels (m=1, 2 . . . ), $N=2^{8+m}$. The moments provide additional image features that can be generated from the image/prediction-error image.

Further, splicing an image often introduces sharp transition in the image 2-D array in terms of edges, lines and corners which are characterized by high frequency components in the Fourier transform domain. In order to enhance the image content containing these high frequency components, embodiments of the invention predict each pixel grayscale value in the original test image by: (1) using neighboring grayscale pixel values; and (2) generating a prediction-error image by subtracting the predicted image from the test image.

In particular, the above-discussed prediction-error image removes low frequency information and maintains high frequency information in the image content, thus making the splicing detection more efficient. That is, by using the prediction-error image, embodiments of the invention reduce the "within-class" distance while increasing the "between-class" distance (i.e., the distance between spliced and non-spliced images).

In addition to features from the test image discussed above, embodiments of the invention also extract features in the same manner from the prediction-error image. The prediction-error image is defined as the difference between the test image and its predicted version. FIG. 1A is an exemplary block diagram for a method for generating a prediction-error image, where x̂ denotes predicted x of a pixel in test image. As shown in FIG. 1A, the difference between a test image 102 and a predicted version of the test image is provided by a image prediction algorithm function 104 that is used to produce a prediction-error image 102'. The image prediction algorithm function 104, as shown in FIG. 1A, is given in Equation (3) as:

$$\hat{x} = \begin{cases} \max(a, b) & c \leq \min(a, b) \\ \min(a, b) & c \geq \max(a, b) \\ a + b - c & \text{otherwise} \end{cases} \quad (3)$$

where a, b, c are neighboring grayscale pixel values of the pixel x and provides the prediction context for determining x̂, which is the prediction value of x. The grayscale values of a, b, c in the prediction context of the prediction algorithm are also illustrated as shown in FIG. 1A. The prediction algorithm of Equation (3) above was developed by M. Weinberger, G. Seroussi, and G. Sapiro, in "LOCOI: A low complexity context-based lossless image compression algorithm", *Proc. of IEEE Data Compression Conf*, pp. 140-149, 1996.

Figure 1B:
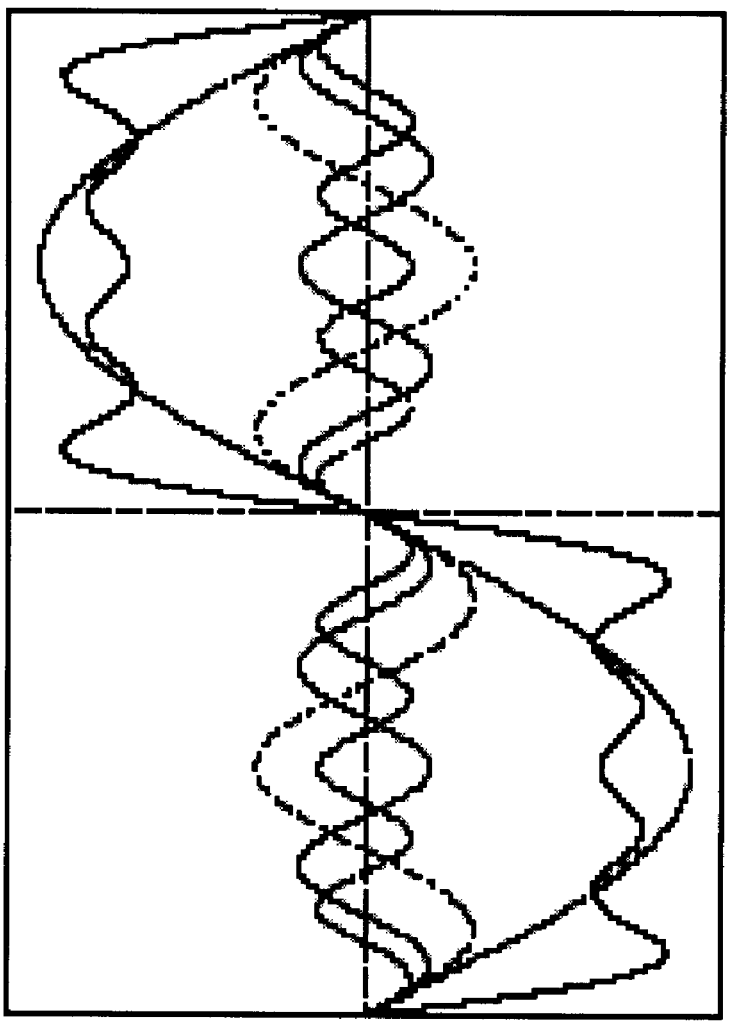
FIG. 1B illustrates phase congruency where Fourier components for a square wave are all in phase at a step point.

Embodiments of the invention that determine 2-D Phase congruency are discussed in the following. Image splicing leaves traces of image manipulation especially at locations where sharp image transitions are introduced. The Local Energy Model postulates that the sharp features are perceived at points of maximum phase congruency in an image. Phase congruency (PC) is defined in terms of the Fourier series expansion of a signal at some location x in Equation (4) as:

$$PC_1(x) = \max_{\bar{\phi}(x) \in [0, 2\pi]} \frac{\sum_n A_n \cos(\phi_n(x) - \bar{\phi}(x))}{\sum_n A_n} \quad (4)$$

where $A_n$ is the amplitude of the nth Fourier component, $\phi_n(x)$ is the local phase of the nth Fourier component at position x, and $\bar{\phi}(x)$ is the amplitude weighted mean local phase angle at position x. In particular, when PC equals to a maximal value of 1, all frequency components are in phase (i.e., there is phase congruency). This is the case of the step function edges, as shown in FIG. 1B. Otherwise, PC takes on values between 0 and 1.

Problems encountered in the calculation of PC according to Equation (4) and a more sensitive measure of phase congruency was developed by P. Kovesi, in "Image features from phase congruency," *Journal of Computer Vision Research*, 1(3): 1-26, 1999. This measure of phase congruency is used in embodiments of the invention. In particular, Kovesi extended the 1-D PC to allow the calculation of 2-D PC of the image by applying 1-D analysis over several orientations and combining the results in some way. To calculate the 2-D PC of a given image (i.e., $PC_2(x,y)$), wherein the image is first convolved with a bank of log-Gabor filters. Let the image denoted by I(x, y), the even-symmetric filter and odd-symmetric filter at scale n and orientation o denoted by $M_{no}^e$ and $M_{no}^o$, respectively.

The responses of each quadrature pair of filters is a vector, as given in Equation (5) as:

$$[e_{no}(x,y), o_{no}(x,y)] = [I(x,y)*M_{no}^e, I(x,y)*M_{no}^o] \quad (5)$$

where * is the convolution operator. From Equation (5), the amplitude of this response is given in Equation (6) as:

$$A_{no}(x,y) = \sqrt{e_{no}^2(x,y) + o_{no}^2(x,y)} \quad (6)$$

and phase is given in Equation (7) as:

$$\phi_{no} = a\tan(e_{no}(x,y), o_{no}(x,y)) \quad (7)$$

Moreover, the 2-D phase congruency array $PC_2$ is then calculated in Equation (8) as:

$$PC_2(x,y) = \frac{\sum_o \sum_n W_o(x,y) \lfloor A_{no}(x,y) \Delta\Phi_{no}(x,y) - T_o \rfloor}{\sum_o \sum_n A_{no}(x,y) + \varepsilon} \quad (8)$$

where $\lfloor \ \rfloor$ denotes that the enclosed quantity is equal to itself if it is positive, and equal to zero otherwise; $W_o(x,y)$ is a measure of significance of frequency spread; $\varepsilon$ is a small positive constant used to prevent division of zero; $T_o$ is a quantity introduced to compensate image noise; and $\Delta\Phi_{no}(x,y)$ is a sensitive phase deviation function defined in Equation (9) as:

$$\Delta\Phi_{no}(x,y) = \cos(\phi_{no}(x,y) - \bar{\phi}_o(x,y)) - |\sin(\phi_{no}(x,y) - \bar{\phi}_o(x,y))| \quad (9)$$

The sharp image features, such as edges and lines, will be perceived and highlighted in a 2-D phase congruency array. Embodiments of the invention construct a number of the plurality of image features by computing and performing analysis of the elements of the 2-D phase congruency array, as discussed above. Exemplary MATLAB® code for computing the 2-D phase congruency array can be found in P. D. Kovesi, "MATLAB code for calculating phase congruency and phase symmetry/asymmetry," which is provided on the MATLAB website.

Figure 1C:
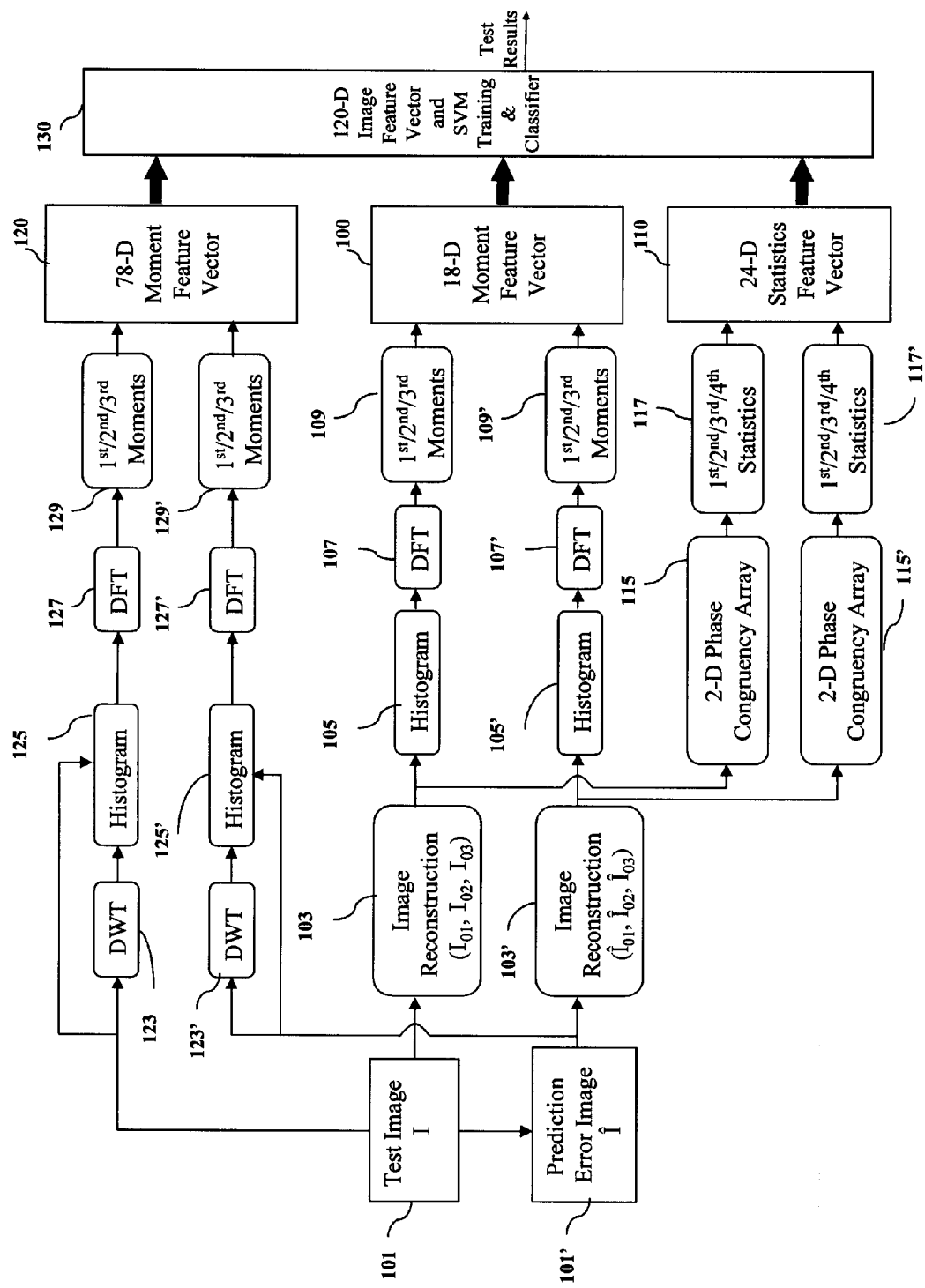
FIG. 1C is an exemplary block diagram of framework for a method for image feature generation.

An exemplary method for image feature generation and extraction is discussed in the following paragraphs. In particular, FIG. 1C is an exemplary block diagram of a framework for a method for image feature generation for embodiments of the invention. In FIG. 1C, a 78 dimensional (78-D) feature vector 120 is determined from the test image I 101 and its prediction-error image Î 101'. These image features are generated from the moments of characteristic functions of the images I, Î.

In addition, as shown in FIG. 1C, a second 18-Dimensional (18-D) moment feature vector 100 is determined from the reconstructed images 103, 103' of the test image I 101 and its prediction-error image Î 101'. To extract the image features from the characteristic functions, embodiments of the invention may use, but are not limited to: the Daubechies (e.g., the db2 wavelet in MATLAB 6.5) and Haar wavelet for the decomposition of the test image I 101, prediction-error image Î 101', and for the generation of reconstructed images 103, 103'.

Further, as shown in FIG. 1C, a 24-Dimensional (24-D) statistical feature vector 110 of the reconstructed images 103, 103' is determined. FIG. 1D shows the equation for computing the mean, variance, kurtosis and skewness of an image 2-D Phase Congruency array that are used in connection with developing the 24-D statistical feature vector 110. Additional details of the operation of the various sub-functions of the method are given in the following paragraphs.

Figure 2:
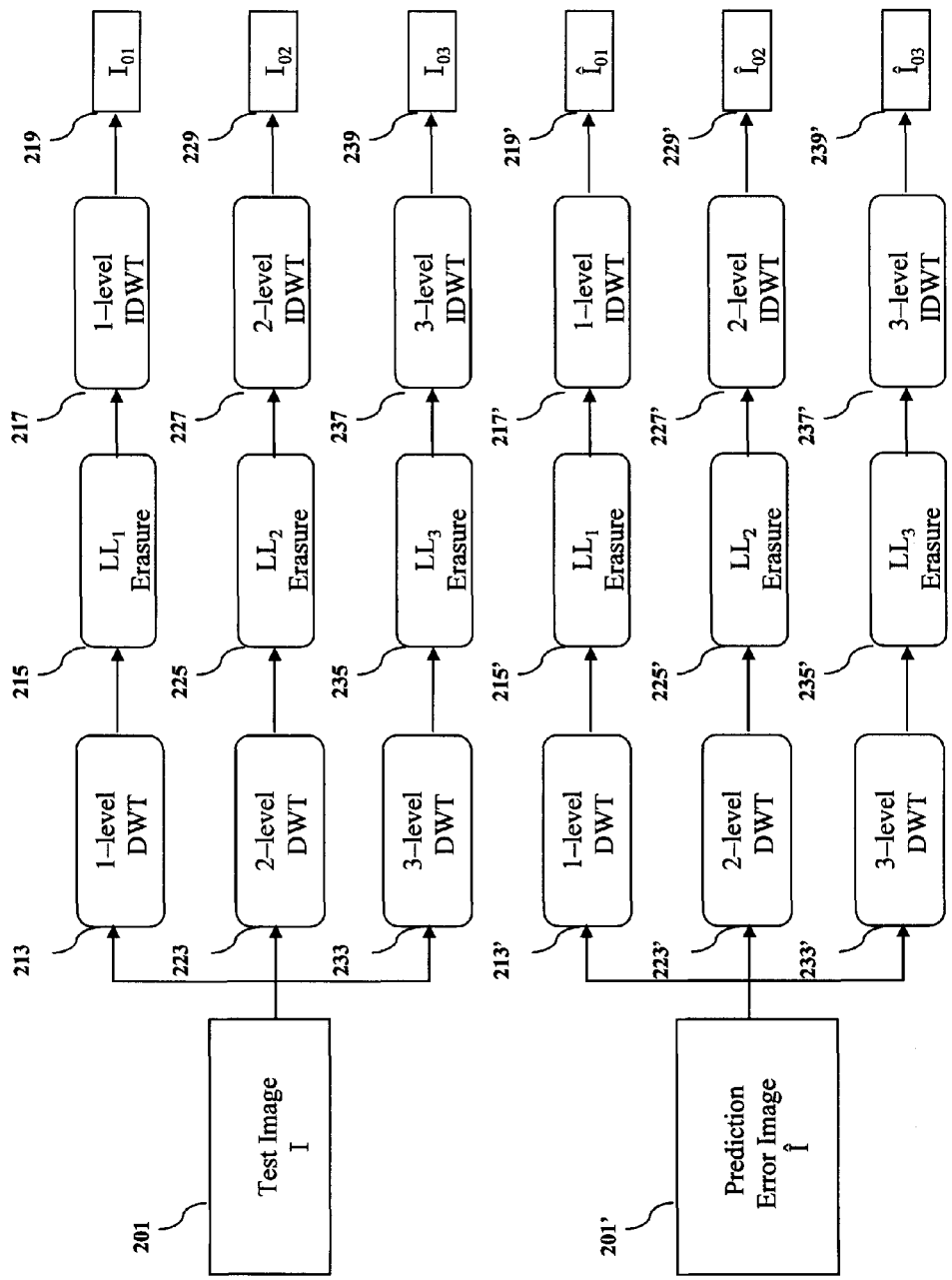
FIG. 2 is an exemplary block diagram for a method for generating reconstructed images with the LL subband erased.

FIG. 2 is an exemplary block diagram for a method for generating reconstructed images with the approximation $LL_i$ sub-band erased. As shown in FIG. 2, after wavelet decompositions 213, 223, 233, the information contained in the approximation sub-band $LL_i$, where i=1, 2, 3, goes through $LL_i$ erase functions 215, 225, 235; and then inverse wavelet transforms 217, 227, 237 are performed. By doing so, we generate three reconstructed images 219, 229, 239 ($I_{Oi}$, where i=1, 2, 3), respectively.

Figure 3:
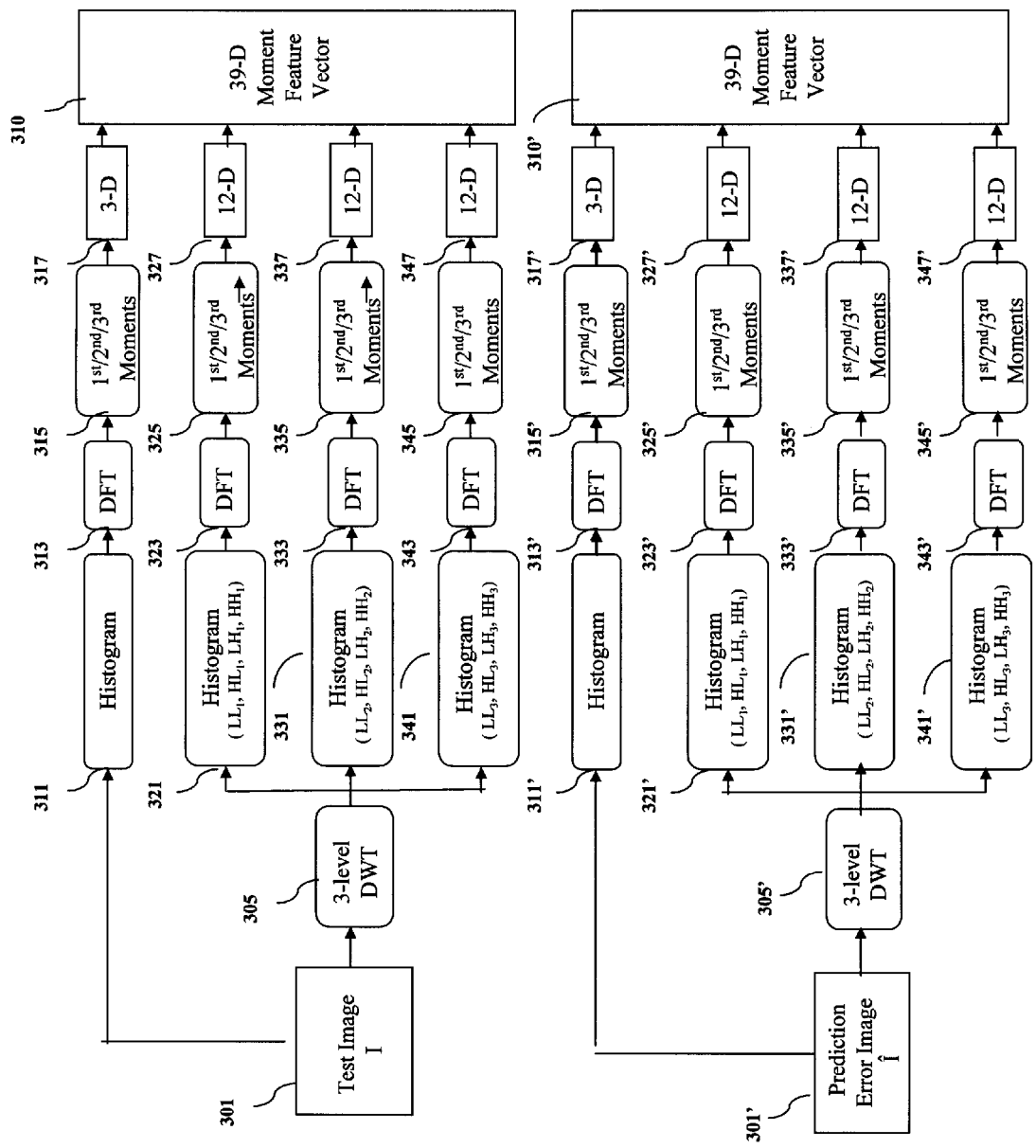
FIG. 3 is an exemplary block diagram for a method for feature extraction from an image and the prediction-error of the image.

FIG. 3 is an exemplary block diagram for a method for feature extraction for embodiments of the invention from a test image 301 and the prediction-error of the test image 301'. At each level i, where i=1, 2, 3, there are four wavelet sub-bands (i.e., approximation ($LL_i$), horizontal ($HL_i$), vertical ($LH_i$) and diagonal ($HH_i$)). If the test image 301 and its prediction-error image 301' are each considered a subband at a level i=0, there are 13 subbands in total. For each wavelet subband of the test image 301, the first three moments are derived according to Equation (2), resulting in a 39-Dimensional (39-D) feature vector 310. In addition, for the prediction error image 301', another 39-D feature vector 310' is extracted. Histogram functions 311 and 321, 331, 341 are computed for each of the sub-bands of the outputs of the test image 301 and the 3 level DWT 305, respectively. The histogram functions 311, 321, 331, 341 outputs provide input data to discrete Fourier Transform (DFT) function blocks 313, 323, 333, 343. $1^{st}/2^{nd}/3^{rd}$-order Moment Generating function blocks 315, 325, 335, 345 are applied to the outputs of the DFT function blocks 313, 323, 333, 343. Embodiments of the invention compute the First/Second/Third Moment Generating function blocks 315, 325, 335, 345 and provide a 3-dimensional (3-D) feature vector 317 and three 12-Dimensional (12-D) feature vectors 327, 337, 347 that are combined to provide the 39-D feature vector 310.

In a similar manner, the prediction error image 301' is processed, as shown in FIG. 3, to produce the (3-D) feature vector 317' and three 12-D feature vectors 327', 337', 347' are combined to provide a 39-D feature vector 310.' These two 39-D feature vectors combine to provide the 78-D moment feature vector 120, as shown in FIG. 1C.

Figure 4:
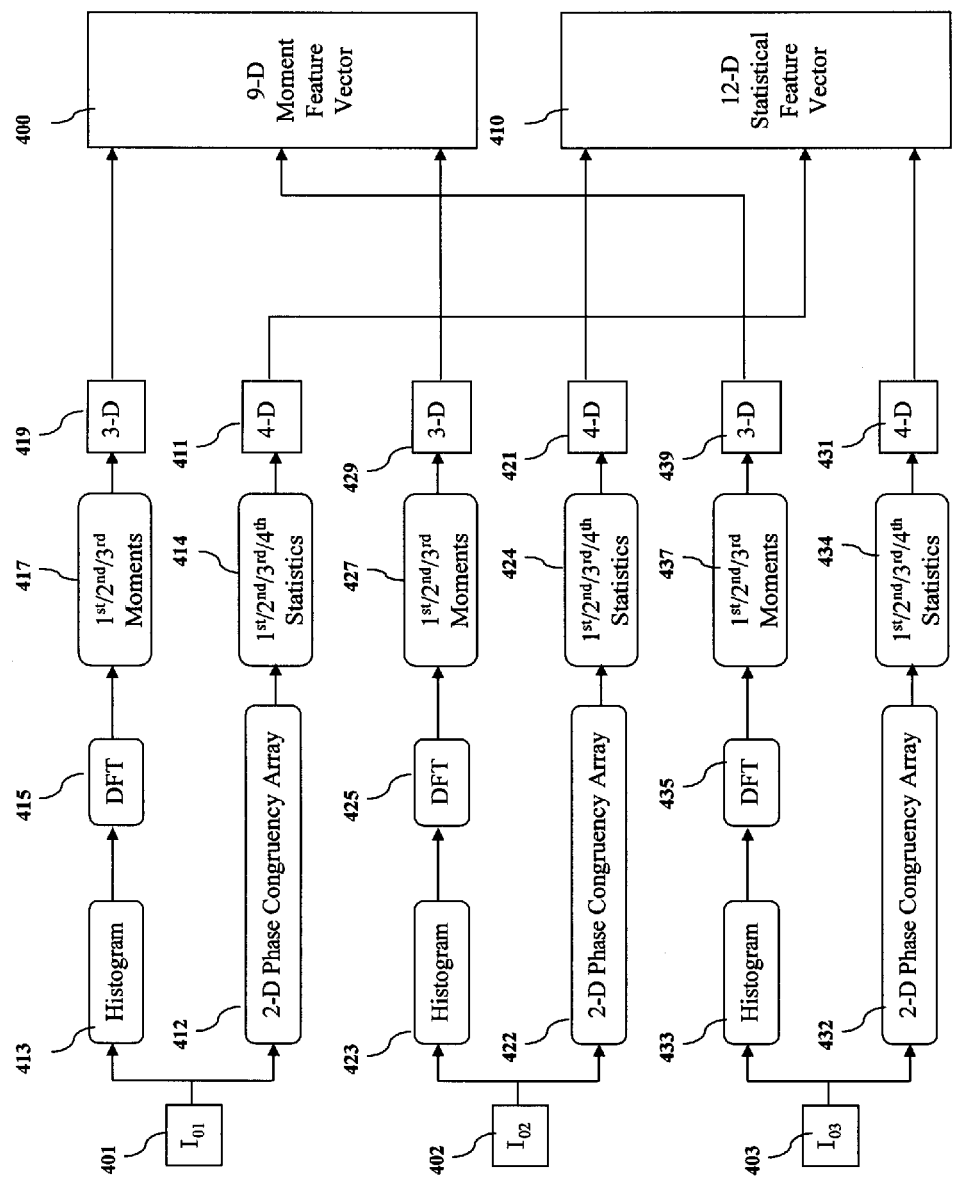
FIG. 4 is an exemplary block diagram for a method for feature extraction from the reconstructed images with LL subband erased.

FIG. 4 is an exemplary block diagram for a method for feature extraction for embodiments of the invention from the reconstructed images with $LL_i$ sub-bands erased. For each reconstructed image 401, 402, 403, a plurality of image features are determined. The plurality of image features further comprises moment feature vector 400 and statistical feature vector 410. In particular, for each reconstructed image 401, 402, 403 histogram functions 413, 423, 433, respectively, are calculated. Next, the outputs of the histogram functions 413, 423, 433 are provided as inputs to the discrete Fourier transform (DFT) functions 415, 425, 435. The outputs of the DFT functions 415, 425, 435 provide inputs to $1^{st}/2^{nd}/3^{rd}$-order Moment Generating functions 417, 427, 437. Each of the $1^{st}/2^{nd}/3^{rd}$-order Moment Generating functions 417, 427, 437 provides one of the 3-Dimensional (3-D) moment image feature vectors 419, 429, 439, respectively. The 3-D moment image feature vectors 419, 429, 439 are combined to provide the 9-D Moment Feature vector 400.

In addition, as shown in FIG. 4, four features: mean, variance, kurtosis and skewness are computed based on 2-D Phase Congruency arrays 412, 422, 432, which are obtained from the reconstructed images ($I_{Oi}$, where i=1, 2, 3). The equations used for the computation of the mean, variance, kurtosis and skewness are given in FIG. 1D. The outputs from the 2-D Phase Congruency arrays 412, 422, 432 are provided to the $4^{th}$-order Statistics Generating functions 414, 424, 434. Each of the $4^{th}$-order Statistic Generating functions 414, 424, 434 provides one of the 4-Dimensional (4-D) image feature vectors 411, 421, 431, respectively. The 4-Dimensional (4-D) statistical feature vectors 411, 421, 431 are combined to produce the 12-D statistical feature vector 410.

Figure 5:
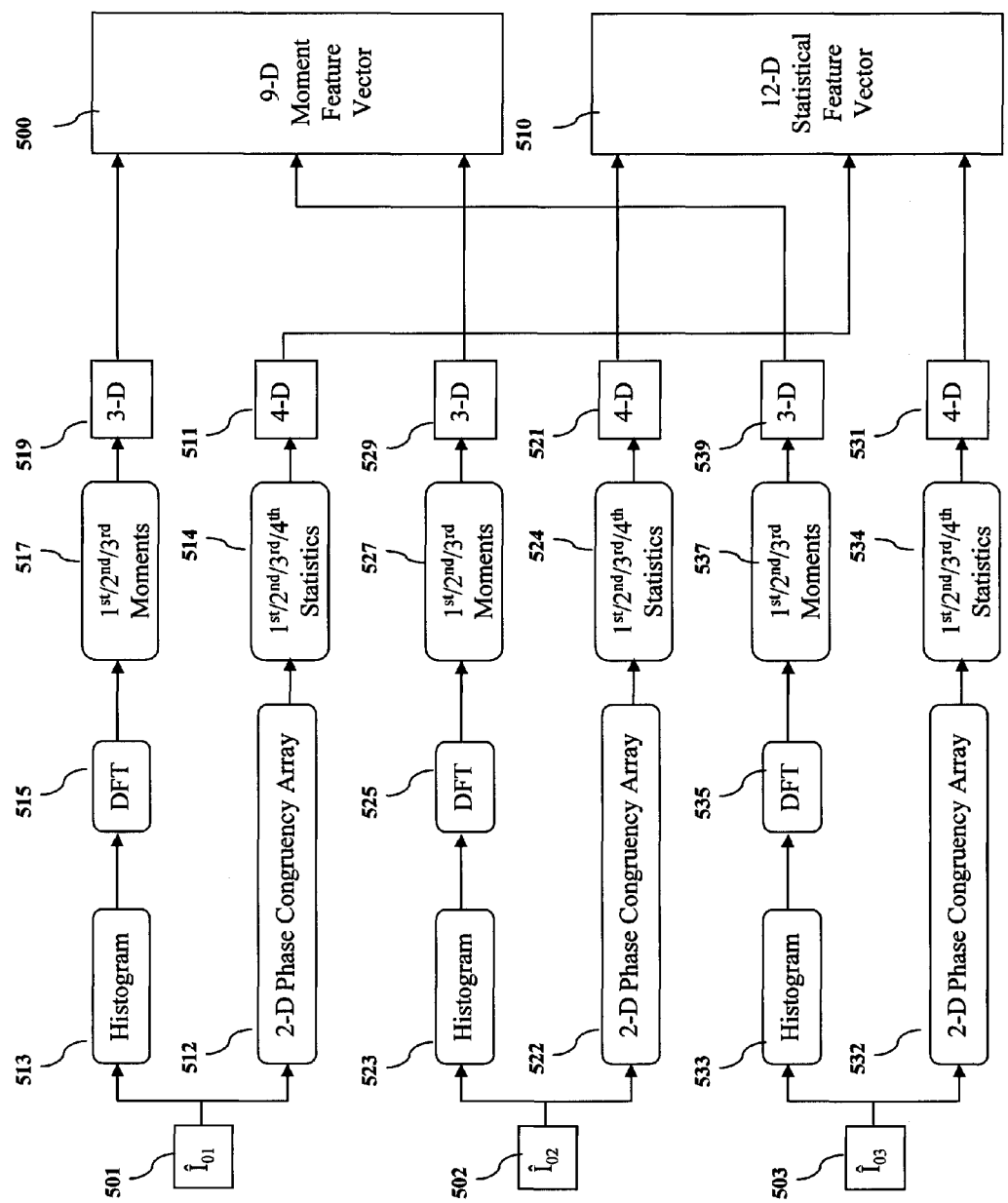
FIG. 5 is an exemplary block diagram for a method for feature extraction from the reconstructed prediction-error images with LL subband erased.

FIG. 5 is an exemplary block diagram for a method for feature extraction from the reconstructed prediction-error images with $LL_i$ subbands erased. For each reconstructed prediction-error image 501, 502, 503, a plurality of image features are determined. The plurality of image features further comprises moment feature vector 500 and statistical feature vector 510. In particular, for each reconstructed prediction-error image 501, 502, 503 histogram functions 513, 523, 533, respectively, are calculated. Next, the outputs of the histogram functions 513, 523, 533 are provided as inputs to the DFT functions 515, 525, 535. The outputs of the DFT functions 515, 525, 535 provide inputs to $1^{st}/2^{nd}/3^{rd}$-order Moment Generating functions 517, 527, 537. Each of the $1^{st}/2^{nd}/3^{rd}$-order Moment Generating functions 517, 527, 537 provides one of the 3-Dimensional (3-D) moment feature vectors 519, 529, 539, respectively. The 3-D moment feature vectors 519, 529, 539 are combined to provide a 9-D Moment Feature vector 500.

In addition, as shown in FIG. 5, four statistical features: mean, variance, kurtosis and skewness, of the reconstructed prediction-error image are computed based on 2-D Phase Congruency arrays 512, 522, 532, which are obtained from the reconstructed images ($\hat{I}_{0i}$, where i=1, 2, 3). The equations used for the computation of the mean, variance, kurtosis and skewness are given in FIG. 1D. The outputs from the 2-D Phase Congruency arrays 512, 522, 532 are provided to the $4^{th}$-order Statistics Generating functions 514, 524, 534. Each of the $4^{th}$-order Statistics Generating functions 514, 524, 534 provides one of the 4-Dimensional (4-D) image feature vectors 511, 521, 531, respectively. The 4-Dimensional (4-D) statistical feature vectors 511, 521, 531 are combined to produce the 12-D statistical feature vector 510.

The combined feature vector outputs from FIG. 3 to FIG. 5, as discussed above, are combined to provides a 120-D feature vector (i.e., FIG. 3=>78-D moment feature vector 120 of FIG. 1C; FIG. 4 and FIG. 5 each provide 18-D moment feature and 24-D statistical feature vectors 100 and 110 of FIG. 1C, respectively).

The motivation for extracting the image and statistical features based on phase is that it provides an absolute measure of the significance of the features such as edges. The splicing process introduces edges or boundaries that may cause inconsistencies in the region. The phase congruency may sensitively capture the edge discontinuities due to splicing. The motivation for using reconstructed images with the $LL_i$ subbands being forced to equal to zero (i.e., erasure) is that the splicing process normally introduces only the disturbance in the high frequency components of the spliced images. Thus, by removing the low frequency components in the approximation subband; the difference between the authentic and spliced images is enhanced.

The following section discusses a Support Vector Machine classifier for embodiments of the invention. A non-limiting example of such a SVM is given in: C. J. C. Burges. "A tutorial on support vector machines for pattern recognition", Data Mining and Knowledge Discovery, 2(2): 121-167, 1998] The linear and RBF kernel SVM are used in our investigation and downloaded from C. C. Chang, C. J. Lin, LIB-SVM: A Library for Support Vector Machines.

As shown in FIG. 1C, a Support Vector Machine (SVM) 130 is used as the classifier in embodiments of the invention and to generate experimental results. At the training stage, given a set of training sample-label pairs ($\vec{x}_i, y_i$), i=1, ..., m, where $\vec{x}_i$ is the image feature vector of the ith training sample and $y_i \in \{1,-1\}$ is the corresponding class label, the SVM solves the following optimization problem, as shown in Equation (10):

$$\min_{\vec{w},b,\alpha_i} \frac{1}{2}\vec{w}^T\vec{w} + C\sum_{i=1}^{m}\alpha_i \qquad (10)$$

$$\text{subject to } y_i(\vec{w}^T\phi(\vec{x}_i) + b) \geq 1 - \alpha_i, \alpha_i \geq 0$$

where C is the penalty parameter of the error term, and the function $\phi$ maps the training feature vector $\vec{x}_i$ into a higher dimensional space. The kernel function $K(\vec{x}_i, \vec{x}_j) = \phi(\vec{x}_i)^T \phi(\vec{x}_j)$ is used to avoid the explicit computation of $\phi$. In generating the experimental results, one of the basic kernels (i.e., radial basis function (RBF)), as shown in Equation (11):

$$K(\vec{x}_i, \vec{x}_j) = \exp(-\gamma\|\vec{x}_i - \vec{x}_j\|^2), \gamma > 0 \qquad (11)$$

where $\gamma$ is the kernel parameter, was used. The penalty parameter C and kernel parameter $\gamma$ must be carefully chosen so that the RBF kernel SVM can give accurate classification results. The "grid-search" method with cross-validation was employed to find the optimal C and $\gamma$.

The image dataset used to produce our experimental results is the Columbia Image Splicing Detection Evaluation Dataset is by courtesy of DVMM, Columbia University. This data set was created for benchmarking blind passive image splicing detection algorithms. Content diversity, source diversity, balanced distribution, and realistic operation are emphasized while this image data set is created. There are five image block types for the authentic and the spliced classes in this data set, i.e., image with an entirely homogeneous textured region, image with an entirely homogeneous smooth region, image with an object boundary between a textured region and a smooth region, image with an object boundary between two textured regions, and image with an object boundary between two smooth regions, respectively. Two kinds of splicing techniques are used: arbitrary-object-shaped splicing and straight line splicing. Moreover, to ensure that sufficiently accurate statistical data can be extracted from each image, all these images are provided of the same size 128×128. It is a data set open for downloading. There are 933 authentic and 912 spliced images in this data set.

The experimental results and discussion to evaluate the performance of the classification method of embodiments of the invention are discussed in the following paragraph. During the testing, 20 runs of linear SVM and 20 runs of RBF kernel SVM with the best parameters C and $\gamma$ were performed. In each run, the training samples were randomly selected from the image dataset to train the classifier. The training sample size to be 5/6 of images (775 authentic and 760 spliced), 1/2 of images (467 authentic and 456 spliced) and 1/3 of images (311 authentic and 304 spliced), respectively were selected. The remaining images were used in testing.

The average detection rate of the 20-run experiments is shown in Table 1, where true positive (TP) represents the detection rate of spliced images, true negative (TN) represents the detection rate of authentic images, and accuracy is the average detection rate. These experimental results show that non-linear classifier outperforms linear classifier. For example, when 5/6 of images are randomly selected as training samples, RBF SVM achieves average detection rate of 82.32% which is 4.53% higher than linear SVM. The results also showed that all the detection rates are higher than 70%.

TABLE 1

| | Training size | | | | | | | | |
|---|---|---|---|---|---|---|---|---|---|
| | 5/6 | | | 1/2 | | | 1/3 | | |
| | TP | TN | Accuracy | TP | TN | Accuracy | TP | TN | Accuracy |
| Linear SVM | 0.8112 | 0.7538 | 0.7819 | 0.8070 | 0.7394 | 0.7728 | 0.7992 | 0.7199 | 0.7591 |
| RBF SVM | 0.8289 | 0.8177 | 0.8232 | 0.8094 | 0.7941 | 0.8017 | 0.7987 | 0.7737 | 0.7861 |

Generally, the available sample size for classifier design is limited, thus the performance of the trained classifier will vary with the samples available for classifier design. We compared the performance of the classifier for three different training sizes: 5/6, 1/2 and 1/3.

Figure 6:
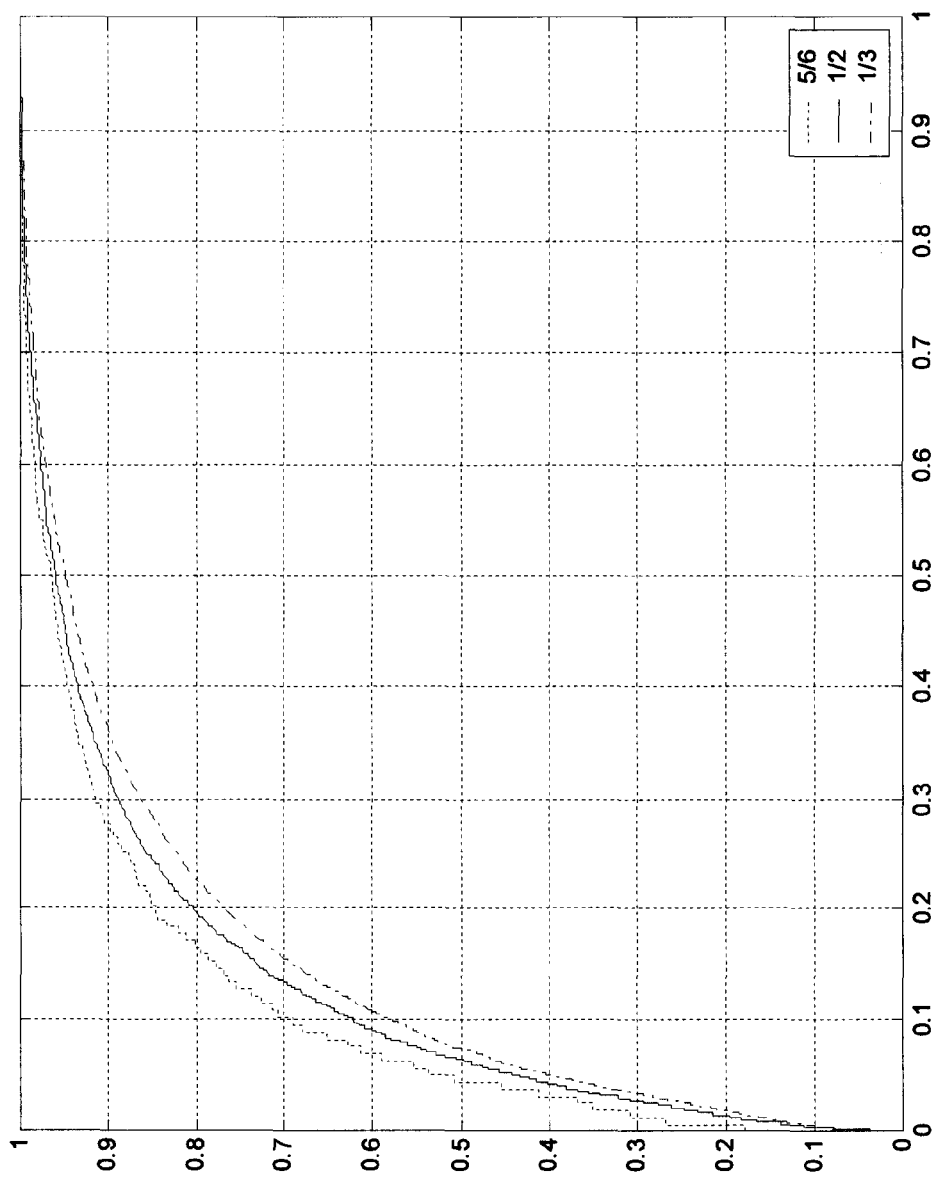
FIG. 6 shows a graph demonstrating the performance improvement when training sample size increases in the case of RBF kernel SVM classifier.
Figure 7:
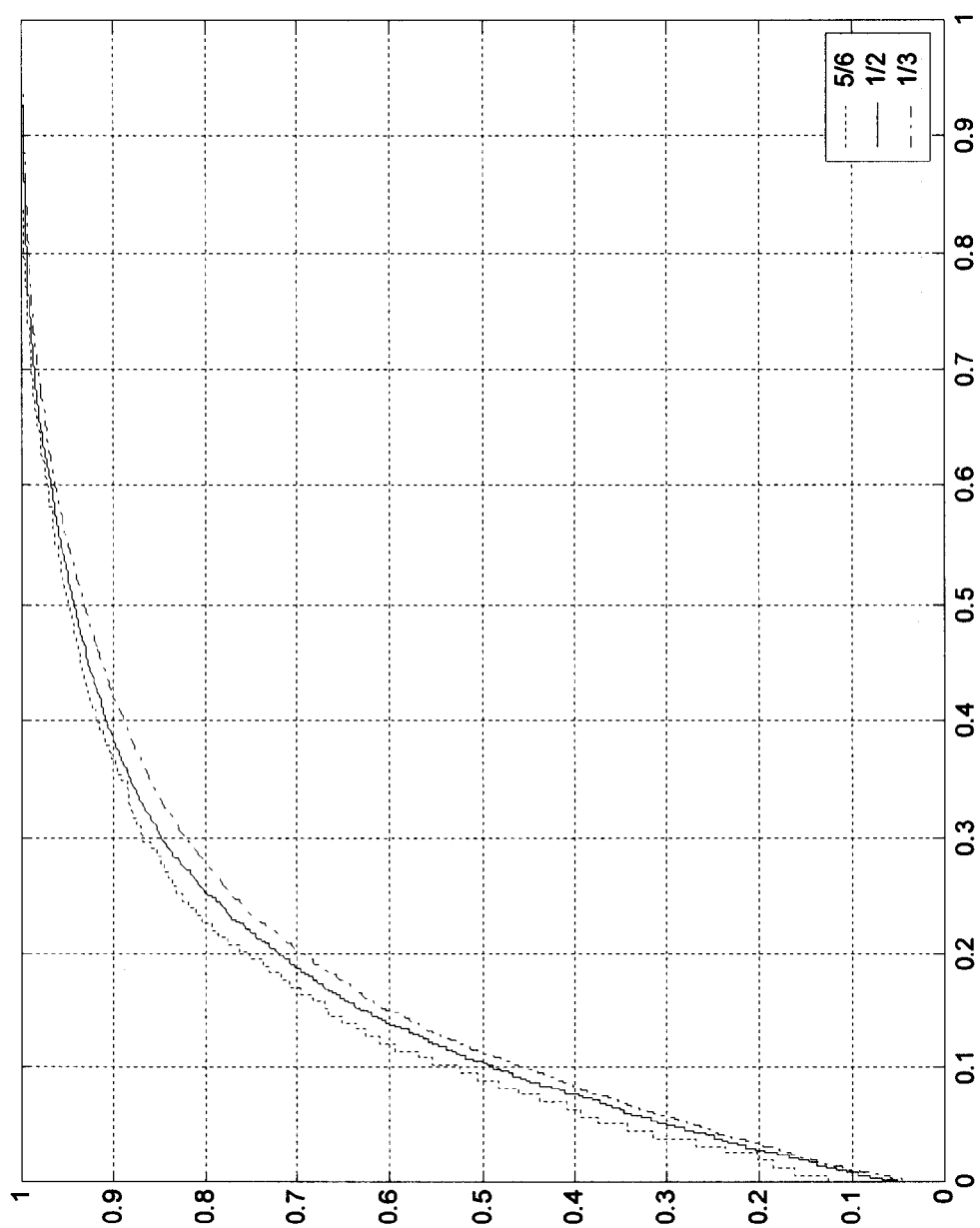
FIG. 7 shows a graph demonstrating performance improvement when the training sample size increases in the case of linear SVM classifier.

FIG. 6 and FIG. 7 show how the performance improves when the training sample size increases. It was also found that the image features of embodiments of the invention are very effective because the classification performance did not degrade much after the sample size significantly decreases. For example, if the training sample size is reduced from 5/6 to 1/3 of the total images (from 1535 to 615), the number of training samples is reduced by about 60%, but the area under ROC curve only decreases by 3.69% from 0.8980 to 0.8611, the detection rate only drops by 3.71% from 0.8232 to 0.7861 (i.e., see Table 1). This implies that the proposed features perform well even for small training size.

Finally, the detection rates achieved by applying different feature sets alone is shown in Table 2, which examines how effective the different combination of the features sets is in splicing detection. The results in Table 2 are obtained when 5/6 sample images are used for training while 1/6 sample images are used for testing. Note that 78D feature set is moments of characteristic functions derived from the test image and its prediction-error image, 18D feature set is moments of characteristic functions from the reconstructed images, and 24D feature set are features collected from 2-D phase congruency of reconstructed images. Table 2 shows that 78 dimensional moment features or 24 dimensional phase features alone can achieve detection rate of more than 70%. If these two sets are combined, the detection rate is even higher and exceeds 80%. The best detection rate of 82.32% is achieved by the 120 dimensional features.

TABLE 2

Detection rates for the combination of different feature sets

| Feature Set | 78D | 18D | 24D | 78D + 18D | 18D + 24D | 24D + 78D | 78D + 18D + 24D |
|---|---|---|---|---|---|---|---|
| TP | 0.7273 | 0.7227 | 0.7138 | 0.7724 | 0.8141 | 0.8289 | 0.8289 |
| TN | 0.7845 | 0.6737 | 0.7111 | 0.7883 | 0.7491 | 0.7959 | 0.8177 |
| Accuracy | 0.7565 | 0.6977 | 0.7124 | 0.7805 | 0.7810 | 0.8121 | 0.8232 |

It will, of course, be understood that, although particular embodiments have just been described, the claimed subject matter is not limited in scope to a particular embodiment or implementation. For example, one embodiment may be in hardware means, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform or means for computing may include, but is not limited to: one or more processing units or processors, one or more input/output devices, such as a display, a keyboard and/or a mouse, and/or one or more memories, such as static random access memory, dynamic random access memory, flash memory, and/or a hard drive. For example, a display or means for displaying may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   generating a prediction-error image from a test image;
   computing reconstructed images of the test image and the prediction-error image;
   computing characteristic functions of the test image and prediction-error image and of the reconstructed images of the test image and the prediction-error image;
   computing 2-Dimensional (2D) phase congruency arrays from the reconstructed image of both the test image and the prediction-error image;

computing a plurality of statistical moments from the characteristic functions;

computing statistics from the 2-D phase congruency arrays;

combining the moments and statistics to form an image feature vector; and analyzing the image feature vector with a classifier configured to determine whether there is tampering in the test image.

2. The method of claim 1, wherein generating the prediction-error image further comprises computing the difference between elements (x) of the test image and outputs of an image prediction algorithm, wherein the outputs of the image prediction algorithm are determined in accordance with a prediction context and an expression for the image prediction ($\hat{x}$) given by:

$$\hat{x} = \begin{cases} \max(a, b) & c \le \min(a, b) \\ \min(a, b) & c \ge \max(a, b) \\ a + b - c & \text{otherwise.} \end{cases}$$

3. The method of claim 2, wherein the prediction context defines locations of positions (a, b, c) relative to the elements (x) of the test image.

4. The method of claim 1, wherein computing a plurality of statistical moments comprises computing $1^{st}$, $2^{nd}$ and $3^{rd}$ order moments ($M_n$), where n=1, 2 and 3 and wherein the moments are computed in accordance with an expression given by:

$$M_n = \sum_{j=1}^{N/2} f_j^n |H(f_j)| \Big/ \sum_{j=1}^{N/2} |H(f_j)|,$$

where $H(f_j)$ is the characteristic function (CF) component at a frequency $f_j$, and N is the total number of points in the horizontal axis of a histogram.

5. The method of claim 1, wherein computing statistics comprises computing $1^{st}$, $2^{nd}$, $3^{rd}$ and $4^{th}$ statistics comprising mean, variance, skewness and kurtosis, respectively.

6. The method of claim 1, wherein the classifier comprises a support vector machine (SVM), and wherein the SVM is configured to solve an optimization problem defined by:

$$\min_{\vec{w}, b, \alpha_i} \frac{1}{2} \vec{w}^T \vec{w} + C \sum_{i=1}^{m} \alpha_i$$

$$\text{subject to } y_i(\vec{w}^T \phi(\vec{x}_i) + b) \ge 1 - \alpha_i, \alpha_i \ge 0,$$

where C is the penalty parameter of an error term, and a function $\phi$ maps a training feature vector $\vec{x}_i$ into a higher dimensional space.

7. The method of claim 6, wherein the radial basis function (RBF) defined by:

$$K(\vec{x}_i, \vec{x}_j) = \exp(-\gamma \|\vec{x}_i - \vec{x}_j\|^2), \gamma > 0$$

where $\gamma$ is a kernel parameter, is used as the kernel of the SVM.

8. The method of claim 1, wherein computing the reconstructed images further comprises:

computing 1-level, 2-level and 3-level DWTs of the test image and the prediction-error image;

determining $LL_1$, $LL_2$ and $LL_3$ erasures of the 1-level, 2-level and 3-level DWT computations, respectively, of the test image and the prediction-error image;

computing 1-level, 2-level and 3-level inverse discrete wavelet transforms (IDWTs) of the test image and the prediction-error image with the $LL_1$, $LL_2$ and $LL_3$ erasures, respectively; and outputting results of the 1-level, 2-level and 3-level IDWT computations as the reconstructed images of the test image and the prediction-error image.

9. The method of claim 8, wherein computing the DWTs of the test image and the prediction-error image further comprises computing a DWT as a 3-level DWT.

10. An apparatus, comprising:
one or more processors configured to:
generate a prediction-error image from a test image;
compute reconstructed images of the test image and the prediction-error image;
compute characteristic functions of the test image and prediction-error image and of the reconstructed images of the test image and the prediction-error image;
compute 2-Dimensional (2D) phase congruency arrays from the reconstructed image of both the test image and the prediction-error image;
compute a plurality of statistical moments from the characteristic functions;
compute statistics from the 2-D phase congruency arrays; and
combine the moments and statistics to form an image feature vector; and
a classifier configured to analyze the image feature vector to determine whether there is tampering in the test image.

11. The apparatus of claim 10, wherein the classifier comprises:
a Support Vector Machine classifier configured to solve an optimization problem defined by:

$$\min_{\vec{w}, b, \alpha_i} \frac{1}{2} \vec{w}^T \vec{w} + C \sum_{i=1}^{m} \alpha_i$$

$$\text{subject to } y_i(\vec{w}^T \phi(\vec{x}_i) + b) \ge 1 - \alpha_i, \alpha_i \ge 0,$$

where C is the penalty parameter of an error term, and a function $\phi$ maps a training feature vector $\vec{x}_i$ into a higher dimensional space.

12. A method, comprising:
generating, in a computing device, a prediction-error image from a test image;
computing reconstructed images of the test image and the prediction-error image;
computing discrete wavelet transforms (DWTs) of the test image and the prediction-error image;
computing histograms of the test image and the prediction-error test image;
computing histograms of at least one wavelet subband of the test image and the prediction-error image;
computing histograms of the reconstructed images of the test image and the prediction-error image;

computing discrete Fourier transforms (DFTs) of the histograms of the test image and the prediction-error image;
computing DFTs of the histograms of the wavelet subbands of the test image and the prediction-error image;
computing DFTs of the histograms of the reconstructed images of the test image and the prediction-error image;
computing 2-D phase congruency arrays of the reconstructed images of the test image and the prediction-error image;
computing moments based on the DFTs of the histograms of the test image and the prediction-error image;
computing moments based on the DFTs of the histograms of the wavelet subbands of the test image and the prediction-error image;
computing moments based on the DFTs of the histograms of the reconstructed images of the test image and the prediction-error image;
computing statistics of the 2-D phase congruency arrays of the reconstructed images of the test image and the prediction-error image;
outputting moment and statistic feature vectors respectively based at least in part on the moments computed in respective ones of said computing moments and the statistics computed in said computing statistics.

13. The method of claim 12, wherein generating the prediction-error image further comprises computing the difference between elements (x) of the test image and outputs of an image prediction algorithm, wherein the outputs of the image prediction algorithm are determined in accordance with a prediction context and an expression for the image prediction ($\hat{x}$) given by:

$$\hat{x} = \begin{cases} \max(a, b) & c \leq \min(a, b) \\ \min(a, b) & c \geq \max(a, b) \\ a + b - c & \text{otherwise.} \end{cases}$$

14. The method of claim 13, wherein the prediction context defines locations of positions (a, b, c) relative to the elements (x) of the test image.

15. The method of claim 12, wherein computing the statistics of the 2-D phase congruency arrays of the reconstructed images further comprises computing $1^{st}$, $2^{nd}$, $3^{rd}$ and $4^{th}$ statistical features.

16. The method of claim 12, wherein the moments based on the DFTs of the histograms of the test image and prediction-error image and the moments based on the DFTs of the histograms of the wavelet subbands of the test image and prediction-error image are combined to provide two 39-Dimensional moment feature vectors that are combined to provide a 78-D moment feature vector;
wherein the moments based on the DFTs of the histograms of the reconstructed images of the test image and prediction-error image are combined to provide two 9-Dimensional moment feature vectors that are combined to provide an 18-D moment feature vector; and
wherein the statistical features of the 2-D phase congruency arrays of the reconstructed images provide two 12-Dimensional statistical feature vectors that are combined to provide a 24-D statistical feature vector.

17. The method of claim 16, wherein the 78-D and 18-D moment feature vectors are combined with the 24-D statistical feature vector to provide a 120-D image feature vector to a Support Vector Machine (SVM) classifier configured to determine whether or not image tampering has occurred, and wherein the SVM solves an optimization problem defined by:

$$\min_{\vec{w},b,\alpha_i} \frac{1}{2}\vec{w}^T\vec{w} + C\sum_{i=1}^{m}\alpha_i$$

subject to $y_i(\vec{w}^T\phi(\vec{x}_i) + b) \geq 1 - \alpha_i, \alpha_i \geq 0$, where C is the penalty parameter of an error term, and a function $\phi$ maps a training feature vector $\vec{x}_i$ into a higher dimensional space.

18. The method of claim 17, wherein the radial basis function (RBF) defined by:

$$K(\vec{x}_i, \vec{x}_j) = \exp(-\gamma\|\vec{x}_i - \vec{x}_j\|^2), \gamma > 0$$

where $\gamma$ is a kernel parameter, is used as the kernel of the SVM.

19. A processor-readable storage device containing software code that, in response to execution by a processor, causes the processor to implement operations for tampering detection, said operations comprising:
generating a prediction-error image from a test image;
computing reconstructed images of the test image and the prediction-error image;
computing characteristic functions of the test image and prediction-error image and of the reconstructed images of the test image and the prediction-error image;
computing 2-Dimensional (2D) phase congruency arrays from the reconstructed image of both the test image and the prediction-error image;
computing a plurality of statistical moments from the characteristic functions;
computing statistics from the 2-D phase congruency arrays;
combining the moments and statistics to form an image feature vector; and
analyzing the image feature vector with a classifier configured to determine whether there is tampering in the test image.

20. The processor-readable storage device of claim 19, wherein generating the prediction-error image further comprises computing the difference between elements (x) of the test image and outputs of an image prediction algorithm, wherein the outputs of the image prediction algorithm are determined in accordance with a prediction context and an expression for the image prediction ($\hat{x}$) given by:

$$\hat{x} = \begin{cases} \max(a, b) & c \leq \min(a, b) \\ \min(a, b) & c \geq \max(a, b) \\ a + b - c & \text{otherwise.} \end{cases}$$

21. The processor-readable storage device of claim 20, wherein the prediction context defines locations of positions (a, b, c) relative to the elements (x) of the test image.

22. The processor-readable storage device of claim 19, wherein computing the reconstructed images further comprises:
computing 1-level, 2-level and 3-level DWTs of the test image and the prediction-error image;
determining $LL_1$, $LL_2$ and $LL_3$ erasures of the 1-level, 2-level and 3-level DWT computations, respectively, of the test image and the prediction-error image;

computing 1-level, 2-level and 3-level inverse discrete wavelet transforms (IDWTs) of the test image and the prediction-error image with the $LL_1$, $LL_2$ and $LL_3$ erasures, respectively; and outputting results of the 1-level, 2-level and 3-level IDWT computations as the reconstructed images of the test image and the prediction-error image.

23. The processor-readable storage device of claim 22, wherein computing the DWTs of the test image and the prediction-error image further comprises computing at least one of the DWTs as a 3-level DWT.

24. The processor-readable storage device of claim 19, wherein computing the statistics of the 2-D phase congruency arrays of the reconstructed images further comprises computing $1^{st}$, $2^{nd}$, $3^{rd}$ and $4^{th}$ statistical features.

25. The processor-readable storage device of claim 24, wherein the moments form 78-D and 18-D moment feature vectors, and;

wherein the statistics form a 24-D statistical feature vector.

26. The processor-readable storage device of claim 25, wherein the 78-D and 18-D moment feature vectors are combined with the 24-D statistical feature vector to provide a 120-D image feature vector to a Support Vector Machine (SVM) classifier configured to determine whether or not image tampering has occurred, and wherein the SVM solves an optimization problem defined by:

$$\min_{\vec{w}b,\alpha_i} \frac{1}{2}\vec{w}^T\vec{w} + C\sum_{i=1}^{m} \alpha_i$$

subject to $y_i(\vec{w}^T \phi(\vec{x}_i) + b) \geq 1 - \alpha_i, \alpha_i \geq 0,$ where C is the penalty parameter of an error term, and a function $\phi$ maps a training feature vector $\vec{x}_i$ into a higher dimensional space.

27. The processor-readable storage device of claim 26, wherein the radial basis function (RBF) defined by:

$$K(\vec{x}_i, \vec{x}_j) = \exp(-\gamma \|\vec{x}_i - \vec{x}_j\|^2), \gamma > 0$$

where $\gamma$ is a kernel parameter, is used as the kernel of the SVM.

* * * * *

UNITED STATES PATENT AND TRADEMARK OFFICE
CERTIFICATE OF CORRECTION

PATENT NO. : 7,991,185 B2
APPLICATION NO. : 11/772671
DATED : August 2, 2011
INVENTOR(S) : Shi et al.

It is certified that error appears in the above-identified patent and that said Letters Patent is hereby corrected as shown below:

On the Title page, item (56), under "Other Publications", Line 6, delete "Highter" and insert -- Higher --.

On the Title page, item (56), under "Other Publications", Line 9, delete "Context-Bassed," and insert -- Context-Based, --.

On the Title page, item (56), under "Other Publications", Lines 13-15, delete ""Videre: Journal of Computer Vision Research" by Peter Kovesi, Quarterly Journal, Summer 1999, vol. 1, No. 3, Teh MIT Press." and insert the same on Title page, Col. 2, line 14, as a new entry.

Column 1, line 7, below "Title" insert -- CROSS-REFERENCE TO RELATED APPLICATION --.

Column 13, lines 64-65, in Claim 7, delete " $K(\vec{x}_i, \vec{x}_j) = \exp(-\gamma \|\vec{x}_i - \vec{x}_j\|^2), \gamma > 0$ " and insert -- $K(\vec{x}_i, \vec{x}_j) = \exp(-\gamma \|\vec{x}_i - \vec{x}_j\|^2), \gamma > 0,$ --.

Column 16, lines 17-18, in Claim 18, delete " $K(\vec{x}_i, \vec{x}_j) = \exp(-\gamma \|\vec{x}_i - \vec{x}_j\|^2), \gamma > 0$ " and insert -- $K(\vec{x}_i, \vec{x}_j) = \exp(-\gamma \|\vec{x}_i - \vec{x}_j\|^2), \gamma > 0,$ --.

Column 17, line 18, in Claim 25, delete "and;" and insert -- and --.

Signed and Sealed this
Fourteenth Day of February, 2012

David J. Kappos
*Director of the United States Patent and Trademark Office*

CERTIFICATE OF CORRECTION (continued)

U.S. Pat. No. 7,991,185 B2

Column 18, lines 7-10, in Claim 26, delete "
$$\min_{\vec{w},b,\alpha_i} \frac{1}{2}\vec{w}^T\vec{w} + C\sum_{i=1}^{m}\alpha_i$$
$$\text{subject to } y_i\left(\vec{w}^T\phi(\vec{x}_i)+b\right) \geq 1-\alpha_i, \alpha_i \geq 0,$$
" and insert --
$$\min_{\vec{w},b,\alpha_i} \frac{1}{2}\vec{w}^T\vec{w} + C\sum_{i=1}^{m}\alpha_i$$
$$\text{subject to } y_i\left(\vec{w}^T\phi(\vec{x}_i)+b\right) \geq 1-\alpha_i, \alpha_i \geq 0,$$
--.

Column 18, lines 18-19, in Claim 27, delete " $K(\vec{x}_i,\vec{x}_j) = \exp\left(-\gamma\|\vec{x}_i-\vec{x}_j\|^2\right), \gamma > 0$ " and insert -- $K(\vec{x}_i,\vec{x}_j) = \exp\left(-\gamma\|\vec{x}_i-\vec{x}_j\|^2\right), \gamma > 0,$ --.